United States Patent [19]

Kummins et al.

[11] 4,125,507

[45] Nov. 14, 1978

[54] PROCESS FOR PRIMING AND COMPOSITIONS THEREFOR

[75] Inventors: Joel S. Kummins, Stone Mountain, Ga.; John C. Smith, Jr., Midland, Mich.

[73] Assignee: Dow Corning Corporation, Midland, Mich.

[21] Appl. No.: 634,303

[22] Filed: Nov. 19, 1975

Related U.S. Application Data

[62] Division of Ser. No. 514,523, Oct. 15, 1974, Pat. No. 3,975,554.

[51] Int. Cl.$^2$ .................. C08K 5/01; C08K 5/06; C08K 5/10; C08L 83/00
[52] U.S. Cl. .................. 260/31.4 EP; 106/287.11; 106/287.14; 106/287.15; 106/287.16; 106/287.22; 260/31.4 R; 260/33.2 EP; 260/33.25 B; 260/33.4 EP; 260/33.1 SB; 260/37 EP; 260/37 SB
[58] Field of Search ............. 260/37 SB, 37 EP, 37 P, 260/31.4 R, 31.4 EP, 33.2 EP, 33.2 SB, 33.4 EP, 33.4 SB; 106/287 SE, 287 SB, 287.11, 287.14, 287.16, 287.22, 287.15

[56] References Cited

U.S. PATENT DOCUMENTS

| | | | |
|---|---|---|---|
| 2,320,842 | 6/1943 | Arnold et al. | 427/10 |
| 2,834,693 | 5/1958 | Jellinek | 106/287 SE |
| 2,979,420 | 4/1961 | Harper | 427/407 R |
| 3,110,601 | 11/1963 | Emblem et al. | 106/287 SE |
| 3,372,052 | 3/1968 | Polniaszek | 427/407 R |
| 3,817,769 | 6/1974 | Fisher | 260/37 SB |
| 3,837,876 | 9/1974 | Mayuzumi et al. | 106/287 SB |
| 3,888,891 | 6/1975 | Smith et al. | 260/37 SB |
| 3,961,977 | 6/1976 | Koda et al. | 106/287 SE |

FOREIGN PATENT DOCUMENTS

49,046/72 5/1974 Australia.
882,067 11/1961 United Kingdom.

*Primary Examiner*—Allan Lieberman
*Attorney, Agent, or Firm*—George A. Grindahl

[57] ABSTRACT

A light-fugitive dye is added to silicon-containing priming compositions to aid in the application of the priming compositions to a surface and to aid in the application of silicon-containing coating compositions over the primed surface before becoming colorless in the presence of light.

3 Claims, No Drawings

PROCESS FOR PRIMING AND COMPOSITIONS THEREFOR

This is a division of application Ser. No. 514,523, filed Oct. 15, 1974, now U.S. Pat. No. 3,975,554.

BACKGROUND OF THE INVENTION

1. Field of the Invention

This invention relates to a process for applying silicon-containing coating compositions and the use of light-fugitive dyes in priming compositions.

2. Description of the Prior Art

Protective coatings are ubiquitous in an industrial society. Building surfaces are coated to protect them from the effects of weather. Sensitive materials are coated to prevent corrosion. Lustrous materials are coated to maintain their brilliance. Materials needing further processing are coated to aid in subsequent handling or treatment.

While the utility of coating compositions is obvious, several problems are associated with their use. In many instances the location of a clear, colorless coating must be known with accuracy to insure complete coverage of a substrate or to identify "leave off" boundaries. Adding a colorant to the coating composition offers a solution to the aforementioned problems. Many coatings, however, must be clear after they are applied, rendering the use of a colorant impossible. On other occasions the prospect of an unsightly appearance of a surface brought about by accidental spillage or misapplication of the coating composition would discourage the use of a colorant in the coating composition. Furthermore, in certain applications a coating composition containing a colorant may undesirably transfer its color to "clean" areas during subsequent handling or processing operations.

The use of fugitive colorants is not new. The textile industry has long utilized fugitive dyes to temporarily identify a fabric or certain of its component parts and subsequently removed the dye by washing or leaching step. An interesting example of the use of a colorant as an indicator is taught by U.S. Pat. No. 3,509,081, to Gignac, wherein a reducible azo dye, is incorporated into a room temperature curing silicone composition. The azo dye undergoes a visible color change when exposed to the atmosphere, thereby indicating the extent of cure in the silicone composition. Of particular interest is French Pat. No. 1,467,175 which teaches the use of a light and/or air sensitive fugitive dye in a non-curing protective coating composition, wherein the fugitive dye must remain visible long enough to insure complete coverage of the article to be protected but must become invisible before the article is handled or further processed.

Currently, many silicon-containing coating compositions require the prior application of a primer to improve the adhesion of the coating composition to a surface. These priming compositions are either colorless or they contain a nonfugitive colorant and, consequently, present all of the problems of application and use that are described above for coating compositions in general. The addition of a fugitive colorant to colorless priming compositions as taught by this invention constitutes a new and useful improvement in the art.

As enumerated above, the prior art teaches the use of a water soluble or leachable colorant. Such a teaching, while being useful in the controlled environment of the textile mill, is of little value for the problems associated with the application of coating compositions to large areas outdoors, where no such environmental control exists. The prior art teaches the use of a silicone composition that contains a colorant which undergoes a useful color change, but not the desired loss of color, when exposed to the atmosphere. The prior art further teaches a coating composition that contains a fugitive dye that loses it color before the coated article is further processed. This teaching does not speak to the problem of priming compositions and their use.

SUMMARY OF THE INVENTION

It is an object of the present invention to provide a process for coating a surface with a silicon-containing coating composition, which process makes use of a priming composition that contains a light-fugitive colorant. A further object of this invention is to provide colored priming compositions that will become colorless in the presence of light when they are not covered within a reasonable length of time after being applied to a surface.

These and other objects will be obvious from the following detailed description of the invention.

This invention relates to a process for coating a surface with a silicon-containing coating composition wherein the surface to be coated is first primed with a film-forming, silicon-containing primer composition containing a primer-soluble, light-fugitive colorant. Before the primer on the surface becomes colorless it is coated with the coating composition, the primer color indicating that the surface being coated has been previously primed. Any primer on the surface, whether intentionally or unintentionally applied and intentionally or unintentionally left uncoated subsequently becomes colorless.

This invention also relates to primer compositions which are useful in the process of this invention.

DESCRIPTION OF THE INVENTION

There is provided by the present invention a process for coating a surface with a silicon-containing coating composition, which process comprises applying a film-forming, silicon-containing primer composition to said surface prior to applying said coating composition, thereby producing a primed surface, wherein said primer composition contains at least one primer-soluble, light-fugitive colorant which will retain at least some of its color for 24 hours and will subsequently become colorless in the presence of light, coating the primed surface with said coating composition before the primer on the surface becomes colorless and allowing any uncoated primer on the surface to become colorless in the presence of light.

There is also provided by this invention a film-forming composition comprising a homogeneous solution of (A) from 0.99 to 15% by weight, based on the total weight of the composition of compounds selected from the group consisting of (1) compounds of the formula

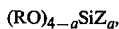

(2) curable reaction products of (a) silanes of the formula

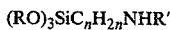

and (b) epoxy compounds soluble in (C) + (D) + (E) below and (3) siloxanes which are condensation and cocondensation products of (1) and (2), (B) from 0.01 to 10% by weight, based on the total weight of the composition, of at least one primer-soluble, light-fugitive colorant which will retain at least some of its color for at least 24 hours and will subsequently become colorless in the presence of light, (C) from 1 to 85% by weight, based on the total weight of the composition, of a solvent of the formula $$R'''O(CHCH_2O)_yH,$$
$$\phantom{R'''O(CH}|\phantom{H_2O)_yH,}$$
$$\phantom{R'''O(C}Q$$

(D) from 1 to 85% by weight, based on the total weight of the composition, of a hydrocarbon solvent with a boiling point from about 50° C. to 250° C. and (E) from 1 to 85% by weight, based on the total weight of the composition, of a solvent of the formula $$\phantom{CH_3}\overset{O}{\underset{\phantom{|}}{\|}}$$
$$CH_3C(OCH_2CH)_yOR''',$$
$$\phantom{CH_3C(OCH_2C}|$$
$$\phantom{CH_3C(OCH_2}Q$$

where $a$ has a value from 0 to 1, $n$ has a value from 3 to 9, $y$ has a value from 0 to 2, Q is hydrogen or methyl, R is independently, alkyl or alkoxyalkyl containing less than 7 carbon atoms, R' is hydrogen or $$-C_mH_{2m}NH_2,$$

where $m$ is 2, 3, or 4, R''' is an aliphatic hydrocarbon radical containing no more than 9 carbon atoms, Z is alkyl, vinyl, phenyl, or $$-C_nH_{2n}NHR',$$

any nitrogen atom being bonded to silicon atoms through at least three carbon atoms.

In the process of this invention the method of applying the primer composition to the surface is not critical. By priming with a primer it is meant modifying a surface with a composition of matter in preparation for some subsequent surface treatment. Any of the common methods of application, such as flooding, spraying, rolling, brushing, dabbing, dipping and the like will suffice. For best results the surface should be primed uniformly and completely. Furthermore, economic considerations, and many times performance considerations, require that the primer composition be applied in a very thin layer. That is, it is often unnecessary, wasteful and counterproductive to apply anything more than an exceedingly thin layer of primer to the surface. Of course, certain porous surfaces may need a more liberal application of primer composition to assure complete coverage. In any event the resulting primed surface differs either chemically or physically, or both from the unprimed surface.

The application of the primer compositions of the present invention is aided by the presence of a light-fugitive colorant in the primer composition to indicate the location as well as the uniformity of thickness of the priming composition on the surface and by the use of one or more volatile organic solvents to control the viscosity and film-forming behavior of the primer composition. Once applied, the primer composition is allowed to dry for an appropriate length of time ranging from a few minutes to a few hours before the coating composition is applied. Drying means the simple loss of solvents by evaporation as well as any chemical reactions that may occur in the film or at its interfaces either before, during or after the loss of solvent by evaporation. The drying time will vary with ambient condition, particularly with temperature. While the addition of heat is not necessary, drying will be accelerated if heat is added. Excessive heat resulting in surface or primer damage should be avoided. During the application and drying of the primer composition the fugitive colorant must retain at least a portion of its color for the purposes of this invention.

The surfaces which are coated with silicon-containing coating compositions and which often require the prior application of a primer are well known in the art. Metal, such as aluminum, iron, copper and their alloys; wood including plywood, particle board, composition board; cementitious materials such as concrete, cinder block, brick; marble, ceramics and glass; painted surfaces and porous plastics such as polyurethane foam and nylon cloth and the like are well known items of commerce. The process and compositions of the present invention are applicable to all such surfaces.

The silicon-containing coating compositions that are used in the present invention are readily available commercial products. They are most frequently obtained and used as formable compositions which undergo a curing reaction when exposed to atmospheric moisture or when catalyzed, and/or heated. Alternatively, flowable compositions which undergo said curing reaction are used for applications which do not require a non-flowing material. It is to be understood that the coating compositions of this invention can also include silicon-containing compositions in solvent, dispersion or emulsion form as well as elastomeric compositions which are partially or substantially fully cured and, as such, are applied in essentially their final form. The silicon-containing component of these coating compositions comprise polysiloxanes containing organic substituents bonded to silicon atoms and are commonly referred to as silicones. The words coated and coating used herein refer to the covering of a primed surface with a relatively thin layer of composition as well as the application of thicker layers of composition or elastomeric articles to primed crevices such as might exist between components of a building or to primed corners such as the angle between a window glass and its frame. Coating compositions therefore include paints, sealants, molded elastomeric parts and the like. It is to be understood that in addition to the silicon-containing components these coating compositions comprise such standard items as fillers, catalysts, pigments, curing agents, performance additives such as antioxidants and process aids, solvents, emulsifiers and the like. The silicon-containing coating compositions of this invention are eventually all solid materials in their final applied and cured state and function as surface coatings, joint sealants, glazing compounds, etc. Whether they are brittle or elastomeric in nature, they all demonstrate physical integrity in the cured state and are considered to be permanent. Hence, they must be firmly attached to the primed surface in order to perform their function satisfactorily. These silicon-containing coating compositions may be applied by the usual techniques such as spreading, trowelling, flowing, rolling, spraying, dipping, smearing, pressing and the like to insure complete coverage of the surface and intimate contact between the primed surface and the coating composition.

After the application of the coating composition, any uncovered primer on the surface experiences a gradual loss of color in the presence of light until a colorless state is reached.

The use, performance and composition of the priming compositions of the present invention are central to the successful use of the process of this invention. Briefly, the film-forming, silicon-containing primer composition must have a dissolved, light-fugitive colorant. It is the inventive purpose of this colorant to aid in the application of the primer composition, and the coating compositions, and then, critically, to become colorless in the presence of light if the primer on the surface is not subsequently coated.

The light-fugitive colorant must be soluble in the primer composition. By primer-soluble it is meant that the colorant must dissolve in the primer composition to the extent that a film of the primer composition containing the colorant displays a visible color when placed on the surface. In those cases where the surface is substantially colorless a small amount of almost any light-fugitive colorant will suffice for the purposes of this invention. For colored surfaces relatively larger concentrations of light-fugitive colorants which provide a color which contrasts with the color of the surface may be required. In any event a homogeneous solution is required.

Except as noted above, the color of the colorant is not critical. Light-fugitive colorants are available which display many colors including red, blue, green, yellow, etc. Many additional colors are available by simply combining two or more colorants in the well-known fashion. It is within the scope of this invention to combine two or more colorants to achieve a desired color. It is a preferred embodiment of the present invention to combine three colorants to produce a light-fugitive green colorant.

The colorant, including any mixture of colorants, may be added to the primer composition in solution, in emulsion or in neat form. Since rapid mixing and uniform distribution is beneficial to the economics of production for the preparation of primer composition, it is preferred to dissolve the colorant in a solvent and then add the solution of colorant to the primer composition. Small amounts of preservative may also be added to the colorant solution to confer hydrolytic and/or oxidative stability. It is to be understood that the colorants of this invention must be stable in the primer composition. By stable it is meant that the colorant's ability to function is not impaired by physical or chemical processes that might occur in the primer composition.

The light-fugitive colorants of the present invention are well known in the textile, cosmetic and food industries. Several standard textbooks of organic chemistry, e.g. *Organic Chemistry*, 3rd. Ed., by Louis Fieser and Mary Fieser, Chapter 36, may be consulted for discussions on the light fugitiveness of the colorants used in this invention, their molecular structure, and physical properties. *The Chemical Formulary*, by H. Bennett, Editor; Chemical Publishing Company, Inc., N.Y., Vol. II, p. 56–57; Vol. IV, p. 38–39, 126–127; Vol. VIII, p. 83–86; Vol. IX, p. 125 lists several oil-, alcohol-, and water-soluble dyes that are suitable for the purposes of this invention and are used in the food and cosmetic industry. The indicated portions of said *Organic Chemistry* reference and said *The Chemical Formulary* references are hereby incorporated by reference. While some of the listed colorants are described as being "fast", others are labeled "light-fugitive". Some of the colorants that are useful for the purposes of this invention are known as F.D. & C. colorants and are currently certified to be used in foods, drugs and cosmetics. An excellent description of this class of colorants can be found in *Handbook of Food Additives*, by Thomas E. Furia, Ed., The Chemical Rubber Co.; Cleveland, Ohio, Chapter 1, which is hereby incorporated by reference.

The majority of the light-fugitive colorants that are useful in the process of this invention are known as water- or alcohol-soluble dyes. Their solubility in primer compositions containing polar solvents such as alcohols, glycols and the like is therefore high. However, primer compositions whose principal solvents are hydrocarbon in nature also dissolve useful quantities of these water-soluble or alcohol-soluble dyes, possibly due to the presence of polar ingredients. For the purpose of the present invention the colorant must be soluble, as defined above, merely in the primer composition.

Examples of water-soluble colorants that are suitably light fugitive for the purposes of this invention include amaranth, brilliant blue (F.D. & C. Blue No. 1) anthraquinone violet B, cyanine green, erythrosine, fluorescein, indigo carmine, metanil yellow, sunset yellow (F.D. & C. Yellow No. 6), tartrazine and Violamine R. Congo red, primulin, auramine and safranin Y are examples of suitable alcohol-soluble dyes. A preferred embodiment of the present invention is a green, light-fugitive dye prepared by combining brilliant blue, tartrazine and sunset yellow, which is available as an aqueous solution as Stayley's ® green food coloring.

The primer composition must maintain at least a portion of its color in the presence of light for a time long enough for the primed surface to be coated with the silicon-containing coating composition, using said color as an application guide. This time will vary from a few minutes to a few hours, depending upon the primer that is being used and will exceed 24 hours only in those rare instances when a lengthy, mandatory pause in the process occurs, e.g. at the end of a normal work period.

After the application of the coating composition over the primed surface has been completed it is desired that any uncovered primer on the surface will subsequently lose its color. The time required for this loss of color to occur will depend upon many factors such as the particular colorant that is used, the nature and intensity of the light, the thickness of the primer composition layer, etc. and cannot be readily predicted. Thus, indigo carmine is known to be more light-fugitive than amaranth. Intense light will fade a color more rapidly than dim light. Ultraviolet light is more effective than visible light for destroying colors. Sunlight is likewise more effective than incandescent light. A desirable interval of time for the loss of color to occur will depend upon personal preference, esoteric judgments, public acceptance, etc. Therefore, by the word subsequently it is meant some time within the time period from one day to 6 weeks after the application of the primer composition to the surface.

The primer compositions of this invention contain one or more volatile organic solvents. These solvents serve as diluents for the composition, as stabilizers of the composition and as a means of controlling film formation. While primer compositions can possess as little as 5% by weight solvent it is usual practice in the art to include at least as much as 50% by weight of solvents in the primer composition. Solvent levels in the range of 85 to 95% by weight, in relation to the total weight of the composition, are common. The preferred amount of solvents to be included in the primer compositions of this invention is from 85% to 99% by weight, expressed in terms of the total weight of the primer compositions.

Examples of volatile organic solvents with boiling points from about 50° C. to 250° C. that may be used for the purposes of this invention include saturated and unsaturated hydrocarbons such as benzene, toluene, xylene, cyclohexane, cyclohexene, heptane, and petroleum naphtha; alcohols of the formula

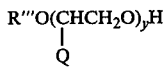

where Q is hydrogen or methyl, y has a value from 0 to 2 and R''' is an aliphatic hydrocarbon radical containing no more than 9 carbon atoms, such as hydrocarbon alcohols such as methanol, butanol, isopropanol, cyclohexanol and hydrocarbon ether alcohols such as the monoalkyl ethers of ethylene glycol, such as 2-methoxyethanol, monoalkyl ethers of propylene glycol, monoalkyl ethers of diethylene glycol and monoalkyl ethers of dipropylene glycol, and the acetate esters of the aforementioned alcohols such as ethoxyethylacetate, otherwise known as Cellosolve ® acetate.

The film-forming primer compositions of the present invention comprise, in addition to the aforementioned solvent and fugitive colorant, silicon-containing film-forming compounds and mixtures of compounds that undergo a curing reaction, to yield solid, continuous films. Silicon-containing compounds which form films, and which are suitable for use in the priming compositions of this invention are (1) compounds of the formula $(RO)_{4-a}SiZ_a$ where each R is independently, alkyl radicals of less than 7 carbon atoms such as methyl, ethyl, isopropyl, and cyclohexyl, and alkoxyalkyl radicals of less than 7 carbon atoms such as 2-methoxyethyl and 2-ethoxyethyl, a has a value from 0 to 1 and Z is alkyl, vinyl, phenyl, or $-(C_nH_{2n})NHR'$ where R' is hydrogen or $-(C_mH_{2m})NH_2,$ n has a value from 3 to 9, m has a value from 2 to 4, any nitrogen atom being bonded to silicon atoms through at least 3 carbon atoms, (2) curable reaction products of (a) a silane of the formula $(RO)_3SiC_nH_{2n}NHR'$ where R, n and R' are as defined above and (b) a soluble epoxy compound and (3) siloxanes which are condensation and cocondensation products of (1) and (2). The soluble epoxy compound can be a pure species or a mixture of ingredients that is characterized by its epoxy equivalent. The epoxy equivalent is the number of grams of epoxy compound that contains one gram-mole of epoxy functionality. By soluble it is understood that the epoxy compound will dissolve in the solvent combination that is used to prepare the primer composition.

Epoxy compounds that are useful in the primer compositions of this invention are commercial products varying in viscosity from flowable fluids to solid resinous materials. They have an average of at least one epoxy group per molecule and are usually complex mixtures of organic molecules possessing an average of one or more epoxy groups per molecule.

For the purposes of this invention (1) can be an orthosilicate such as methylorthosilicate, ethylorthosilicate propylorthosilicate and methoxyethylorthosilicate; an alkoxysilane such as methyltrimethoxysilane, vinyltriethoxysilane, phenyltributoxysilane, methyldibutoxymethoxysilane and methyldimethoxypropoxysilane; an aminoalkylsilane such as 3-aminopropyltrimethoxysilane and 3-aminobutyltriethoxysilane and an aminoalkylaminoalkylsilane such as N-(2-aminoethyl)-3-aminopropyltrimethoxysilane and mixtures of said silanes. The curable reaction products of (2) are prepared by allowing a $NH_2$-containing silane of (1) to react with a soluble epoxy compound in such a ratio so as to provide two epoxy groups for every one $-NH_2$ group, and in the presence of at least one mole of an alcohol solvent for every $-NH_2$ group. The nature and identity of the alcohol solvent has been described above.

The siloxanes of (3) that are suitable for this invention are formed by condensation reactions between alkoxy silanes. While we do not wish to limit this invention by theory, it is believed that these siloxanes are generally formed by hydrolysis of an alkoxysilane with a molecule of water to form a silanol (HOSi≡) followed by condensation of two silanols, not on the same silicon atom, to form a molecule of water and a siloxane bond consisting of two silicon atoms bonded to an oxygen atom. One example of such a siloxane is ethylpolysilicate which can be prepared by the partial hydrolysis of ethylorthosilicate.

It is to be understood that this invention does not exclude silanol-containing components which may be derived by partial hydrolysis of (1), (2) or (3).

It is a preferred embodiment of the present invention to prepare a film-forming primer composition by combining (a)

$H_2NCH_2CH_2NHCH_2CH_2CH_2Si(OCH_3)_3$ with (b) a liquid or solid epoxy resin, such as Dow Epoxy ® 667 (commercially available from Dow Chemical Co.) dissolved in (c) the monomethylether of ethylene glycol, (d) toluene and (e) the acetate ester of the monoethylether of ethylene glycol followed by adding an aqueous solution of tartrazine, brilliant blue and sunset yellow.

The process and compositions of the present invention are particularly useful for priming the many surfaces of buildings prior to the application of sealant and coating compositions. For example, when plywood roof decks are coated with silicon-containing compositions to protect them from the destructive effects of sunlight and weather, adhesion is promoted between the plywood and the coating by the prior use of a silicon-containing primer composition. It is very important that the plywood be completely primed since unprimed areas will not develop as strong a bond to the protective coating and subsequent separation of protective coating from the plywood may occur. In practice, priming composition is usually applied beyond the boundries of the area to be coated in order to insure complete priming of the boundries and thereby insure maximum adhesion of the protective coating to the plywood. Prior to this invention if a colorant was used to indicate the location of the primer composition, the uncoated primer composition that was applied beyond the boundries to be coated gave an undesirable appearance to the building. If no colorant was incorporated into the primer composition errors of application would occur. The practice of this invention will permit the uncoated primer on the surface to lose its color, thereby avoiding any unsightly appearance.

Occasionally, colored primer compositions are accidently applied, through carelessness or ignorance, to areas of the building that are not to be coated. Unsightly staining of the building requiring expensive clean-up or repair could result. The compositions of the present invention provide a unique solution to this problem. The light-fugitive colorant becomes colorless in the presence of light and permanent, unsightly staining is avoided. Furthermore, difficult and expensive clean-up procedures are avoided and a more economical operation is obtained.

The following examples are illustrative of the process and compositions of this invention and are not intended to limit this invention which is properly delineated in the claims.

EXAMPLE 1

A primer composition was prepared by dissolving 14 g. of a commercial solid epoxy resin known as Dow Epoxy ® 667 in a mixture of 104 g. of 2-methoxy ethanol, 104 g. of toluene and 104 g. of 2-ethoxyethyl acetate and then adding 1.5 g of aminoethylaminopropyltrimethoxysilane. To 100 g. of the resulting solution was added 1.0 g. of an aqueous solution of tartrazine, brilliant blue and sunset yellow, otherwise known as Stayley's ® green food coloring.

Concrete, marble and plywood surfaces were covered with the green solution and allowed to dry in the air. The green color on said surfaces disappeared completely after six weeks of exposure to sunlight.

EXAMPLE 2

The primer composition of Example 1 was applied to a polyurethane foam surface. After drying the primed polyurethane foam was coated with a room-temperature curing, silicon-containing coating composition. Any primed polyurethane foam remaining uncovered became colorless within 6 weeks.

That which is claimed is:

1. A film-forming composition comprising a homogeneous solution of
   (A) from 0.99 to 15% by weight, based on the total weight of the composition of compounds selected from the group consisting of
   (1) compounds of the formula $(RO)_{4-a}SiZ_a,$ (2) curable reaction products of
   (a) silanes of the formula $(RO)_3SiC_nH_{2n}NHR'$ and
   (b) epoxy compounds soluble in (C) + (D) + (E) below, and
   (3) siloxanes which are condensation and cocondensation products of (1) and (2),
   (B) from 0.01 to 10% by weight, based on the total weight of the composition, of at least one light-fugitive colorant which will retain at least some of its color for at least 24 hours and will, within six weeks thereafter, become colorless, in the presence of light,
   (C) from 1 to 85% by weight, based on the total weight of the composition, of a solvent of the formula $$R'''O(CHCH_2O)_yH,$$
   $$\quad\quad\quad | $$
   $$\quad\quad\quad Q$$

(D) from 1 to 85% by weight, based on the total weight of the composition, of a hydrocarbon solvent with a boiling point from about 50° C. to 250° C., and
   (E) from 1 to 85% by weight, based on the total weight of the composition, of a solvent of the formula $$CH_3\overset{O}{\overset{\|}{C}}(OCH_2CH)_yOR'''$$
   $$\quad\quad\quad\quad | $$
   $$\quad\quad\quad\quad Q$$

where
   $a$ has a value from 0 to 1,
   $n$ has a value from 3 to 9,
   $y$ has a value from 0 to 2,
   Q is hydrogen or methyl,
   R is independently alkyl or alkoxyalkyl containing less than 7 carbon atoms,
   R' is hydrogen or $-C_mH_{2m}NH_2$, where
   $m$ is 2, 3, or 4,
   R''' is an aliphatic hydrocarbon radical containing no more than 9 carbon atoms,
   Z is alkyl, vinyl, phenyl, or $C_nH_{2n}NHR'$, any nitrogen atom being bonded to silicon atoms through at least three carbon atoms.

2. The composition of claim 1 wherein
   (C) is the monomethyl ether of ethylene glycol,
   (D) is toluene, and
   (E) is the acetate ester of the monoethyl ether of ethylene glycol.

3. The composition of claim 2 wherein the silane (2) (a) is $(CH_3O)_3SiCH_2CH_2CH_2NHCH_2CH_2NH_2$ and the light-fugitive colorant is an aqueous solution of tartrazine, brilliant blue and sunset yellow.

* * * * *

UNITED STATES PATENT AND TRADEMARK OFFICE
CERTIFICATE OF CORRECTION

PATENT NO. : 4,125,507
DATED : November 14, 1978
INVENTOR(S) : Joel S. Kummins et al It is certified that error appears in the above-identified patent and that said Letters Patent are hereby corrected as shown below:

Column 1, line 40, after the word "by" insert --a--
Column 2, line 45, "producting" should read --producing--
Column 4, line 19, after the word "are" insert --all--
Column 6, line 65, after the word "is" insert --the--

Signed and Sealed this

Seventeenth Day of July 1979

[SEAL]

Attest:

LUTRELLE F. PARKER
*Attesting Officer*   *Acting Commissioner of Patents and Trademarks*